United States Patent [19]

Souther

[11] 3,807,808
[45] Apr. 30, 1974

[54] DEVICE FOR LOCATING THE PARTICULAR RAILROAD CAR CAUSING AN EMERGENCY BRAKE APPLICATION

[75] Inventor: George L. Souther, Atlanta, Ga.

[73] Assignee: Southern Railway Company, Washington, D.C.

[22] Filed: Mar. 9, 1973

[21] Appl. No.: 339,880

[52] U.S. Cl..................... 303/1, 246/169 R, 303/18
[51] Int. Cl............................................. B60t 17/22
[58] Field of Search................ 303/1, 18, 86; 74/39; 246/169 R

[56] References Cited
UNITED STATES PATENTS

| | | | |
|---|---|---|---|
| 1,953,008 | 3/1934 | Farmer | 303/1 |
| 2,638,864 | 5/1953 | Beck | 246/169 R X |
| 3,304,420 | 2/1967 | Bowman | 303/1 X |
| 3,531,981 | 10/1970 | Pommer | 303/1 X |

Primary Examiner—Duane A. Reger
Attorney, Agent, or Firm—Watson, Cole, Grindle & Watson

[57] ABSTRACT

An emergency brake application locating device for a train of cars includes a timer housing removably connected to the emergency brake vent of the first head and first rear car of the train. The housing is provided with a movable piston for actuating a timer disposed in a predetermined position therewithin. A tested time of progression of emergency brake application between the first head and the first rear cars is determined by initiating intentionally the emergency brake application and then reading the difference in time for actuation of each timer. Thereafter, the difference in elapsed time of progression of emergency brake application from the car causing an undesired emergency to the first head and to the first rear cars, respectively, is determined by again reading the difference in time for actuation of each timer. A predetermined relationship between the tested time and the elapsed time difference identifies the car causing the undesired emergency.

7 Claims, 5 Drawing Figures

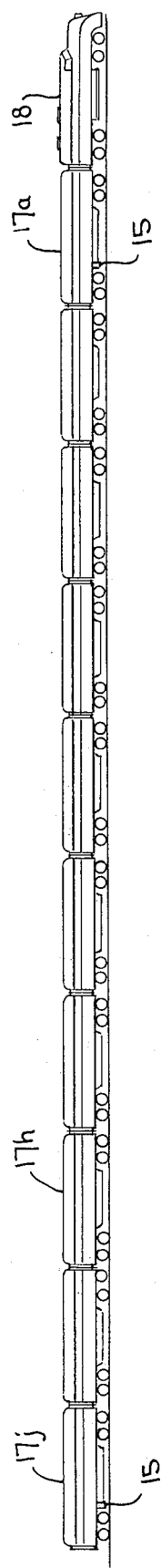
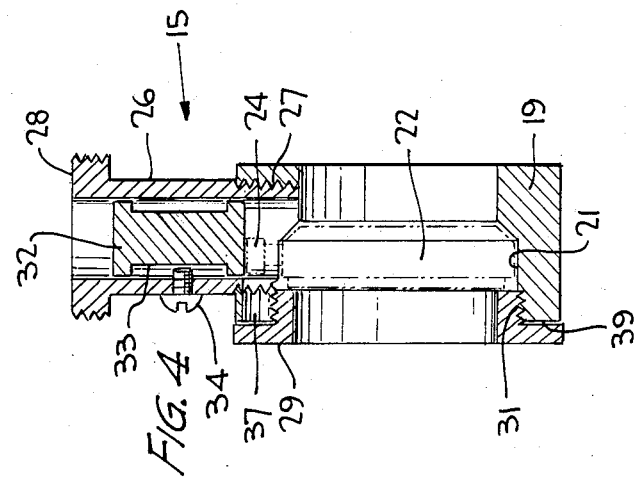
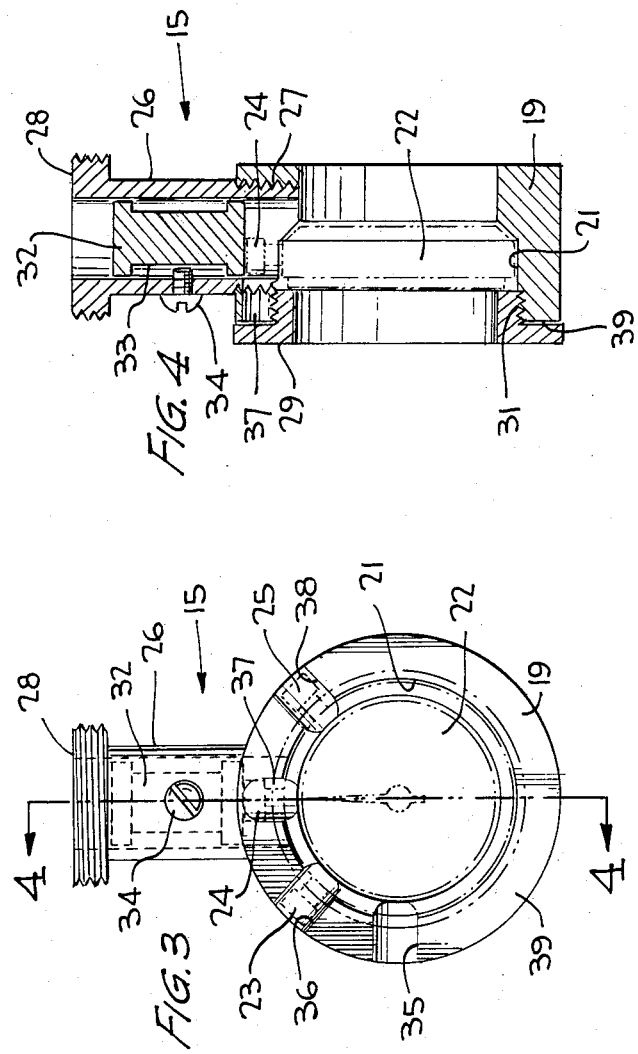

DEVICE FOR LOCATING THE PARTICULAR RAILROAD CAR CAUSING AN EMERGENCY BRAKE APPLICATION

This invention relates generally to railroad cars having fluid pressure brake systems, and more particularly to a device for locating the car in a train of railroad cars causing an undesired emergency brake application.

Despite the highly sophisticated fluid pressure brake systems developed for effectively stopping railroad cars in an emergency situation, the problem of accurately and conveniently locating the specific railroad car causing an emergency brake application during an undesired emergency has plagued the railroad industry for some time. The railroad attendants are normally required to walk th entire length of the train, during which time the fluid pressure brake system for each car of the train must be carefully inspected to determine which brake pipe vent valve device of the particular car had operated to effect a sudden venting of fluid under pressure from the brake pipe to cause propagation of the emergency action through the train. When such a car is located, the necessary repairs of the fluid pressure brake system thereof, and other needed repairs, are made. This long and tedious exercise results in considerable downtime for the train, especially one having a large number of railroad cars, and scheduling of the train run is drastically disrupted.

In solving this problem, a device containing a timer is installed on the brake vent of the first head and the first rear car of the train in such a position that the timer may be actuated by the venting of brake pipe air during an emergency condition. the time elapsed for brake pipe pressure to pass serially through the train between the first head and the first rear car during initiation of the emergency brake application may be determined with the use of these devices. Thereafter, the rapid venting of brake pipe air of the particular car causing an undesired emergency, effects an emergency reduction rate of brake pipe pressure to pass from such car serially and rapidly through the train toward each of the first head and first rear cars. The difference in elapsed time for the brake pipe pressure to pass in such manner is determined by each of the devices and is related to the time determined earlier for the pressure to normally pass between the first head and the first rear cars, to thereby identify the car causing the undesired emergency. The device designed to quickly and effectively facilitate location of the car causing the undesired emergency, constitutes the principal object of the present invention.

Another object is to provide such a device as including a housing having an open-ended cylinder mounted thereon for connecting the housing with the emergency brake vent. The housing has a cavity for the reception of a timer having at least one control stem thereon, which stem is received within an open slot in the housing and extends in alignment with the axis of the cylinder. Means provided within the cylinder are moved into contact with the control stem as the brake pipe air is vented to thereby actuate the timer.

A further object of the present invention is to provide such a device wherein the movable means within the cylinder comprises a floating piston, and four of such open slots are provided for the accommodation of three control stems provided for the timer, the slots facilitating two shifted positions for the timer so that either the stopping control stem or the starting control stem may, if desired, be aligned with the axis of the cylinder during operation of the device.

Other objects, advantages and novel features of the invention will become apparent from the following detailed description of the invention when considered in conjunction with the accompanying drawings wherein:

FIG. 2 is a diagrammatic view showing a train of cars illustrating operation of the locating device;

FIG. 3 is a plan view of the locating device containing the timer, with the cover thereof removed for clarity; and FIG. 4 is a sectional view of the locating device, with its cover in place, taken along the line 4—4 of FIG. 3.

Figure 1:
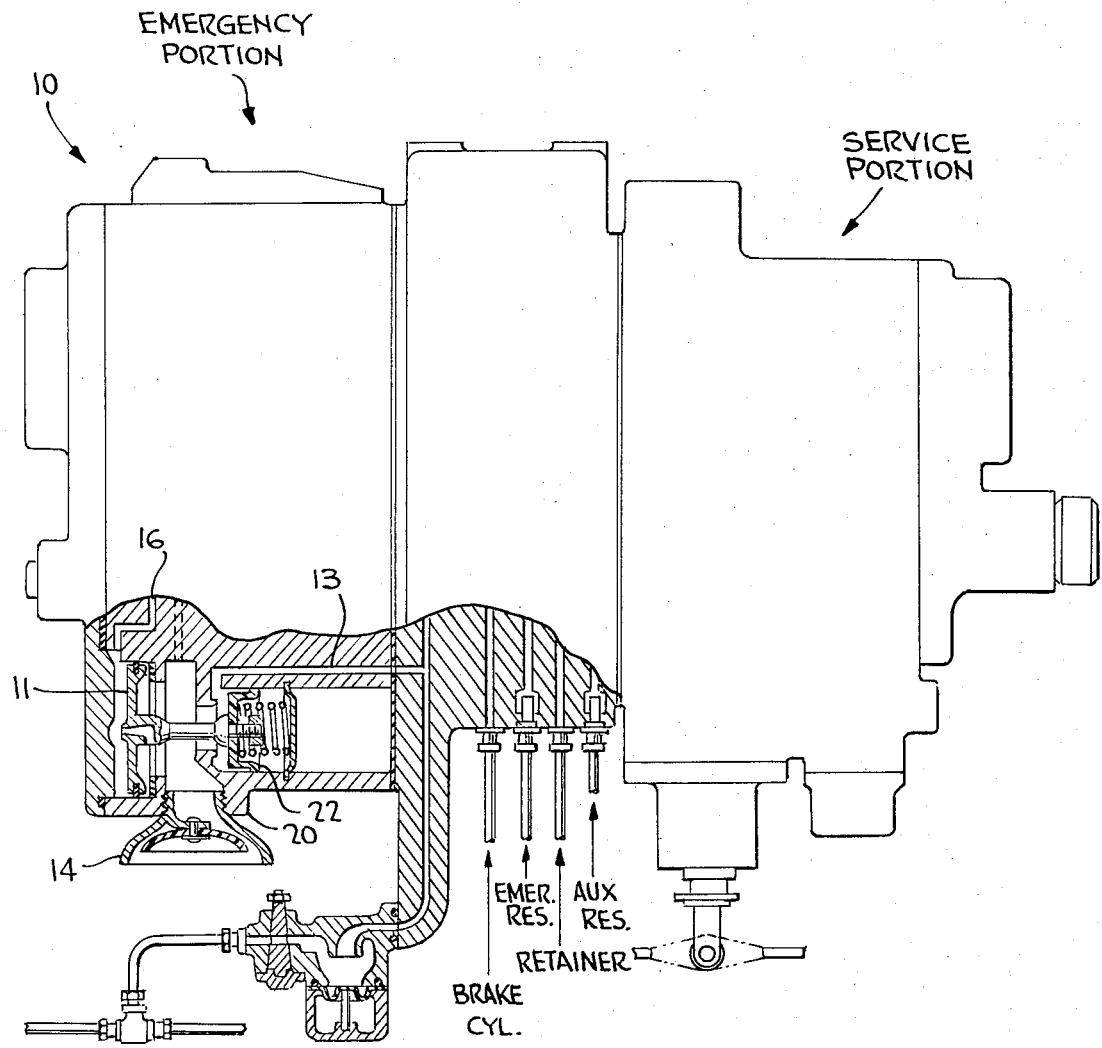
FIG. 1 is a diagrammatic view of a typical fluid pressure brake partly broken away showing the emergency portion thereof with the vent protector in place.

Turning now to the drawings wherein like reference characters refer to like and corresponding parts throughout the several views, FIG. 1 is a diagrammatic view, partly in section, of the fluid pressure brake equipment with the locating device of the invention mounted on the emergency brake vent portion thereof. The equipment of FIG. 1 includes a service portion adapted to operate upon a service reduction in brake pipe pressure to effect a service application of the brakes, and an emergency portion adapted to operate along with the service portion upon an emergency reduction in brake pipe pressure to effect an emergency application of the brakes.

The emergency portion, shown only in part in FIG. 1, comprises a piston subject to the opposing pressures of the brake pipe and a chamber, and is adapted to operate upon a service reduction in brake pressure to move an auxiliary slide valve relative to a main slide valve in a service position in which fluid under pressure is vented from a quickaction chamber at the same rate as the brake pipe pressure is reduced to thereby prevent further movement of the piston and auxiliary slide valve upon a service reduction in brake pipe pressure. The communication through which fluid under pressure is vented from the quick-action chamber in the service position of the auxiliary slide action valve is so restricted, however, as to prevent the pressure in the quick-action chamber from reducing as fast as the brake pipe pressure reduces upon an emergency reduction. Therefore, upon an emergency reduction in brake pipe pressure, a sufficient differential of pressures is obtained on the emergency piston to move this piston and the auxiliary slide valve past service position to an emergency position in which fluid under pressure is vented from the quick-action chamber to flow through passage 16 to the left of a vent valve position 11. The resulting movement of the piston unseats vent valve 12, opening a large and direct passage from brake pipe passage 13 to atmosphere by vent protector 14. As shown in the drawings, this vent protector is threadedly secured in place at the emergency portion of the brake apparatus by means of flange 20. The rapid venting of brake pipe air from brake pipe passage 13 causes an emergency reduction rate of brake pipe pressure to pass serially and rapidly through each car 17 of the train shown in FIG. 2 due to the same operation of connected valves, and insures the prompt movement of valves on the other cars to an emergency position.

Further description of this standard braking equipment is believed not necessary for purposes of this invention.

Figure 1A:
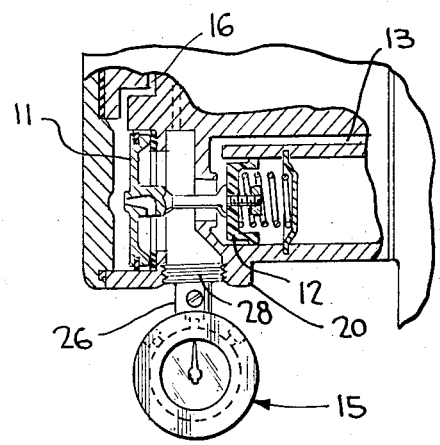
FIG. 1a is a diagrammatic view showing a portion of FIG. 1 with the locating device of the present invention mounted in place of the vent protector.

A locating device 15, designed in accordance with the invention, is threadedly mounted on flange 20 of the emergency brake vent in place of the standard vent protector 14, as shown in FIG. 1a. A locating device 15 is installed in such manner on the first head car 17a and on the first rear car 17j, as illustrated in FIG. 2 which diagrammatically shows a locomotive 18 and a train of 10 cars 17a to 17j for purposes of illustration.

The details of locating device 15 are shown in FIGS. 3 and 4 wherein the device is shown as including a cylindrical housing 19 having a cavity 21 for the reception of a timer 22 shown in phantom for clarity. The timer may comprise a standard mechanical stopwatch having the usual outwardly spring-projected control stems 23, 24 and 25. In this instance, control stem 23 is designed for resetting the timer, control stem 24 represents a stop button for the timer and control stem 25 is the starting button. It should be noted, however, that a timer having only a reset button and a control stem for both initiating and terminating its timing function may be used, or such a timer may have only a single stem for all three operations without departing from the scope of the present invention.

The locating device further includes an open-ended piston cylinder 26 threadedly engaged with the periphery of the housing as at 27, or otherwise mounted thereto. The opposite end of cylinder 26 is provided with a threaded collar 28 which, as can be seen in FIG. 1a, threadedly engages with the emergency brake vent flange 20 for installing each locating device in place after vent protector 14 has been removed from the first head car and the first rear car of the train. A cover 29 is threadedly engaged with housing 19 as at 31 for securely maintaining timer 22 in place within cavity 21 of the housing. Moreover, an axially movable piston 32 is disposed within cylinder 26, the piston having a narrow diameter central portion 33 presenting spaced shoulders. A simple screw member 34 is located on and projects into cylinder 26 so as to limit axial movement of piston 32 during contact with the shoulders presented by central portion 33.

As clearly seen in FIG. 3, four slots 35, 36, 37 and 38 are provided along the periphery of housing 19 with each slot opening both into the front face 39 of the housing and into the periphery thereof. Also, the slots are radially spaced along the periphery in accordance with the standard spacing of a multi-stem stopwatch. Each stem of the timer 22 shown in FIGS. 3 and 4 may be manipulated by the operator from outside the housing with cover 29 in place by merely depressing the control stems exposed through slot 36, and through slot 35 or through slot 38. The contol stem received by slot 37 may be manually depressed by simply pushing against piston 32 through the open end of cylinder 26. Also, it should be noted that four slots 35 to 38 are selected for a three-stem stopwatch so that the stopwatch may be positioned in the housing with either its stop button 24 under piston 32 or with start button 25 positioned in alignment with cylinder 26 and beneath piston 32. The purpose of such alternate positions for the timer will be developed more fully hereinafter.

While the stopwatches of two locating devices in the position shown in FIG. 3, i.e., with stop button 24 beneath piston 32, start button 25 on each timer may be depressed for simultaneously initiating the timing function. It should be noted that the outer ends of each stem 23, 24 and 25 lie just inside the peripheral surface of housing 19 so as to facilitate easy manipulation of the stems outwardly of the housing. One operator then installs one of the devices into the emergency brake vent of the first head car 17a, and another operator installs the other device into the emergency brake vent of the first rear car 17j of the train. With the timers now functioning and the stop buttons 24 disposed beneath pistons 32, an emergency brake application is initiated from either end of the train, i.e., from the head or the rear of the train. A tested time lapse (designated T) for the emergency reduction of brake pipe pressure to pass serially through the train between cars 17a and 17j is determined from the difference in reading of the two timers. In other words, piston 32 of each device will be moved inwardly against stop button 24 as fluid under pressure is vented from the quick-action chamber through passage 13 to the open end of each piston 32 as the vent valve piston 11 is unseated. Inward movement of each piston 32 serves to depress stop buttons 24 to thereby terminate the timing function of each timer. The elapsed time for the brake pipe pressure to pass between cars 17a and 17j during the intentional application of the emergency brake is determined by noting the difference in elapsed time between the timers.

Locating devices 15 may then be removed from their respective vent flanges and, after cover 31 is removed, each timer may be shifted in a counterclockwise direction so that their respective start buttons 25 lie in slots 37 and beneath pistons 32. Covers 31 are then secured in place and the timers are reset by depressing control stems 23. The devices are now reinstalled into their respective emergency brake vents of the first head and the first rear cars. The timers are now at rest with a zero reading. Thereafter, at such time as any one of the cars 17a through 17j causes an emergency brake application during travel of the train, the rapid venting of brake pipe air through the emergency brake vent of the particular car causing the undesired emergency effects a reduction of brake pipe pressure to pass rapidly and serially from such car in directions toward the first head and the first rear cars, respectively. When reaching these cars, the brake pipe air vents through the emergency brake vent and again causes piston 32 of each device to move inwardly to depress start button 25 of each timer. The timing function of each timer is now initiated and, with the train brought to a stop with application of the emergency brakes, the operators remove each of the devices and one of them simultaneously depresses stop button 24 of both timers. The difference in elapsed time noted on both timers is recorded and is designated d. With the use of the simple formula:

$$T - d/2T \ X \ ;$$

where X designates the total number of cars in the train, the car causing the undesired emergency may be quickly and easily identified. Also, the timer noted as having the longer time reading shows that the car causing the undesired emergency will be on that end of the train.

As an example, with the tens cars illustrated in FIG. 2, if the cars causing the undesired emergency happened to be car 17j, and considering travel of brake pipe air pressure at 120 ft. per second, approximately 0.6 seconds will elapse between actuation of stop buttons 24 during the tested time lapse of emergency brake application. Accordingly, T = 0.6. Also, considering the difference in elapsed time $d$ as noted on the two timers during an undesired emergency as being 0.3 seconds (it would take approximately 0.5 seconds before the start button of the timer on car 17j is actuated, and approximately 0.45 seconds before the start button on the timer of car 17a is actuated), the car identified as causing the undesired emergency would be identified as 2+ when using the formula T−$d$/2T X and the figures selected above. Since the timer on car 17j is actuated first in the above example, that timer shows the longer time reading as compared to the timer on car 17a. The factor 2 therefore shows that the second car 17h from the first rear car 17j caused the emergency. Of course, the length of a train of especially freight cars more nearly approaches 100 as compared to 10 as used in the above example so that the accuracy in reading the difference in elapsed time in seconds may be more accurately made.

From the foregoing, it can be seen that a simple and inexpensive yet highly reliable locating device has been provided for identifying the particular railroad car in a train of cars which is responsible for causing an undesired emergency brake application. The considerable downtime in reaching the train's destination normally occurring during the inspection of each car after an undesired emergency occurs, is drastically reduced. More reliable scheduling operation for the train run is therefore made possible, and the total time for each run may be held normal.

Obviously, many modifications and variations of the present invention are possible in the the light of the above teachings. It is therefore to be understood that within the scope of the appended claims, the invention may be practiced other than as specifically described.

What is claimed is:

1. A device for locating the car causing an application of the emergency brake of a train of railroad cars each having a fluid pressure brake system, comprising a timer housing having a cavity and being removably connected to the emergency brake vent of a first head and a first rear car of the train, respectively, said housing being substantially cylindrical and having an open-ended piston cylinder mounted on the periphery thereof, movable means in said cylinder, said housing having at least one open slot on its periphery which slot extends into said cavity and into said cylinder, a timer disposed within said cavity, at least one outwardly projecting control stem of a predetermined length on said timer extending into said slot, said piston being actuated by the venting of brake pipe fluid through said vent during an emergency reduction rate of brake pipe pressure of said first head and said first rear car, movement of said means in said cylinder upon said actuation serving to depress said timer stem to thereby actuate said timer, whereby a tested time lapse of emergency brake application between said first head and said first rear cars may be made during an initiation of the emergency brake application to thereby determine the time elapsed between actuation of said timers, whereafter the difference in elapsed time of emergency brake application from the car causing an undesired emergency to said first head and said first rear cars, respectively, is determined as the undesired emergency brake application causes actuation of each said timer, a predetermined relationship between the tested time and the difference in elapsed time serves to identify the car causing the emergency.

2. The device according to claim 1 wherein said movable means comprises a floating piston.

3. The device according to claim 1 wherein said cylinder has means thereon for connecting said housing to said emergency brake vent.

4. The device according to claim 1 wherein said timer has three of said control stems for respectively stopping, starting and resetting said timer, and wherein said housing is provided with four of said open slots on the periphery thereof, said stems each extending respectively into three adjacent ones of said slots in a first position wherein said stopping stem is in alignment with said piston, and said stems extending respectively into three adjacent ones of said slots in a second position wherein said starting stem is in alignment with said piston.

5. The device according to claim 2 further comprising means on said cylinder for limiting axial movement of said piston within said cylinder.

6. The device according to claim 1 further comprising a cover removably connected to said housing for covering said timer within said cavity.

7. The device according to claim 4 wherein the thickness of said housing peripheral wall is slightly greater than the length of said respective control stems.

* * * * *